United States Patent Office 2,955,097
Patented Oct. 4, 1960

2,955,097

METHOD OF MAKING OIL EXTENDED SYNTHETIC RUBBER AND CARBON BLACK MASTERBATCHES

Woodrow W. White, Oxford, Conn., assignor to United States Rubber Company, New York, N.Y., a corporation of New Jersey No Drawing. Filed Apr. 26, 1954, Ser. No. 425,733

4 Claims. (Cl. 260—33.6)

This invention relates to an improved method of making masterbatches of synthetic rubber and oil extender and carbon black.

Vulcanizates made from oil extended synthetic rubber and carbon black masterbatches prepared by the present invention show a significantly higher abrasion resistance than similar vulcanizates made from masterbatches prepared in the conventional manner by separately dispersing the oil and carbon black in water with anionic dispersing agents and adding the two dispersions separately to an anionic latex, or mixing the two dispersions before adding to an anionic latex, and then co-coagulating the synthetic rubber, oil and carbon black to form the masterbatch.

According to the present invention, the oil and black are first made into a cationic aqueous dispersion of the two by means of cationic surface-active agent, and then sufficient anionic-surface active agent is added to transform the oil-carbon black dispersion into an anionic dispersion. The thus prepared anionic oil-carbon black dispersion is mixed with an anionic synthetic rubber latex, and the synthetic rubber and oil and carbon black are co-coagulated to form the improved masterbatch. The cationic dispersion of the oil and carbon black may be made by premixing the oil and carbon black and dispersing the mixture in water by means of a cationic surface-active agent. This dry method while applicable to a carbon black plant may be dusty and cumbersome in a synthetic rubber plant. However, the oil and carbon black may be first separately dispersed in or wetted with water before being formed into the cationic dispersion of the two. Such a cationic dispersion of the oil and carbon black however formed is a two phase system in which the carbon black particles coated with oil are dispersed in the water, whereas if the oil and carbon black are separately dispersed in water with anionic surface-active agent and the dispersions are mixed, there results only a three phase system of separate particles of oil and carbon black dispersed in the water similarly to when the two anionic dispersions are added separately to the latex. When the cationic dispersion of the oil-coated carbon black particles is made anionic, the oil-coated carbon black particles is made anionic, the oil-coated carbon black particles remain as one phase although of course, they then are negatively charged and are compatible with the negatively charged synthetic rubber particles in the anionic latex.

As in conventional practice the processing oil, which is used in amount from 25 to 100 parts per 100 parts of the synthetic rubber, may be one or a mixture of aromatic, naphthenic or asphaltic rubber softening oils. Such softening or processing oils, as is known, may be distilled oil fractions or residual oils from the distillation of petroleum, or distilled oil fractions from the distillation of coal tar. The carbon black, which may be the usual furnace or channel carbon black, is used in conventional amount from 25 to 100 parts per 100 parts of synthetic rubber. The ratio of oil to carbon black in the mixture will be the same as that in the final masterbatch, viz. from 1:4 to 4:1.

The concentration of processing oil and carbon black in the cationic aqueous dispersion of the two is not critical, usually concentrations of 10 to 30% of the oil and carbon black mixture being used. The amount of cationic surface-active agent in the cationic aqueous dispersion of the oil and carbon black mixture is not critical and will generally be from ½ to 10 parts per 100 parts of the oil and carbon black mixture. The amount of anionic surface-active agent to transform the cationic dispersion of the oil and carbon black to an anionic dispersion need only be that amount which will impart a negative charge to the oil-coated carbon black particles. Larger amounts to give any desired excess may, however, be added, e.g. in amount to give up to 10 or more parts of free or excess anionic surface-active agent per 100 parts of the oil and carbon black mixture. The amount of anionic surface-active agent in the synthetic rubber latex will generally be from 3 to 10 parts per 100 parts of synthetic rubber in the latex. The concentration of synthetic rubber in the latex will generally be from 20% to 60%.

The polymerizable material in the preparation of the anionic rubber latex may be one or a mixture of butadienes-1,3, for example, butadiene-1,3, 2-methyl butadiene-1,3 (isoprene), piperylene, 2,3-dimethyl butadiene-1,3. The polymerizable material, as is known, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group and are copolymerizable with butadienes-1,3, are aryl olefines, such as styrene, vinyl naphthylene; alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridine, 2-methyl-5-vinyl pyridine, vinyl carbazole. Such a synthetic rubber latex may generically be termed a "butadiene polymer synthetic rubber latex".

The cationic surface-active agents that may be used for preparing the cationic aqueous dispersion of oil and carbon black are those conventional surface-active agents in which the ion carrier of an organic group having more than eight carbon atoms is positively charged. Examples of such cationic surface-active agents are:

(1) Quaternary ammonium salts in which one of the groups attached to the nitrogen is an organic radical having at least 8 carbon atoms (e.g. trimethyl cetyl ammonium iodide, lauryl pyridinium chloride, cetyl dimethyl benzyl ammonium chloride, N-stearyl betaine).

(2) Amines, amides, diamines and glyoxalidines having an organic radical containing at least 8 carbon atoms, and their acid esters (e.g. stearylamine hydrochloride, oleyl amide, N,N-diethyl N-oleyl ethylene diamine, 2-heptadecyl N-hydroxyethyl glyoxalidine).

The anionic surface-active agents that may be used for preparing the latex or for transforming the cationic dispersion of the mixture of processing oil and carbon black into an anionic dispersion are those conventional surface-active agents in which the ion carrier of an organic group having more than 8 carbon atoms is negatively charged. Such anionic surface-active agents have a general formula selected from the group consisting of R—COOM, R—SO₃M, and R—O—SO₃M, where M represents alkali-metal ammonium or substituted ammonium (amine) radical, and R represents an organic radical containing at least one group having more than 8 carbon atoms. Examples of such anionic surface-active agents are:

(1) Soaps (e.g. sodium laurate, ammonium stearate, diethanol ammonium oleate, sodium or potassium soaps of rosin acids or of disproportionated rosin acids or of dehydrogenated rosin acids).

(2) Alkyl sulfonates (e.g. dodecyl sodium sulfonate, cetyl potassium sulfonate).

(3) Alkyl sulfates (e.g. sodium dodecyl sulfate, sodium oleyl sulfate).

(4) Sulfonated ethers of long and short chain aliphatic groups (e.g. $C_{17}H_{33}$—O—$C_2H_4$—SO₃—Na).

(5) Sulfated ethers of long and short chain aliphatic groups (e.g. $C_{17}H_{33}$—O—$C_2H_4$—O—SO₃Na).

6. Sulfonate alkyl esters of long chain fatty acids, e.g.

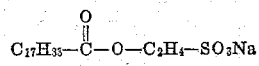

(7) Sulfonated glycol esters of long chain fatty acids, e.g.

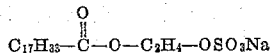

(8) Sulfonated alkyl substituted amides of long chain fatty acids e.g.

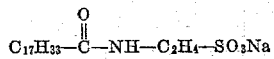

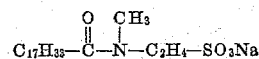

(9) Alkylated aryl sulfonates (e.g. isopropyl naphthalene sodium sulfonate, dodecyl benzene sodium sulfonate).

(10) Hydroaromatic sulfonate (e.g. tetrahydronaphthalene sodium sulfonate).

(11) Alkyl sulfosuccinates (e.g. dioctyl sodium sulfosuccinate).

(12) Aryl sulfonate-formaldehyde condensation products e.g. condensation product of formaldehyde and sodium naphthalene sulfonate

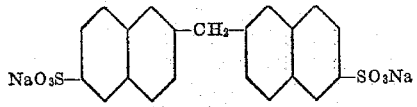

The following example illustrates the present invention. All parts and percentages referred to herein are by weight. In the laboratory, the abrasion resistance rating of a given rubber compound is generally measured by comparing the volume loss with the volume loss from a standard sample under the same abrading conditions. A modified Lambourn abrader, which is a constant slip type abrader, as described by J. W. Adams et al. in the article "Abrasion Resistance of GR-S Vulcanizates" in Rubber Chemistry and Technology, 25, 191–208 (April-June 1952), was used in all the abrasion tests referred to herein with the amount of slip between the sample wheel of the compound under test and the abrasive wheel controlled to 24±1 percent. As discussed in the Adams et al. article, the abrasion resistance rating are calculated by the following formula to bring them in line with reported tire tread wear ratings:

$$\text{Abrasion resistance rating} = \frac{200 V_s}{V_a + V_s}$$

where:
$V_s$=volume abrasion loss of standard
$V_a$=volume abrasion loss of vulcanizate rated.

As may be seen, the smaller the abrasion loss and the higher the abrasion resistance rating, the better is the abrasion resistance of the vulcanizate.

*Example I*

The synthetic rubber latex was made according to the formula:

| | Parts by weight |
|---|---|
| Butadiene | 75 |
| Styrene | 25 |
| Potassium soap of disproportionated rosin acid | 4.0 |
| Sodium salt of condensation product of formaldehyde and naphthalene sulfonic acid | 0.1 |
| Potassium hydroxide | 0.05 |
| Trisodium phosphate | 0.3 |
| Mixed tertiary mercaptan ($C_{12}$, $C_{14}$ and $C_{16}$) | 0.11 |
| Cumene hydroperoxide | 0.12 |
| Ferrous sulfate | 0.20 |
| Potassium pyrophosphate | 0.20 |
| Water | 200 |
| Potassium dimethyl dithiocarbamate* | 0.15 |

* Added as shortstop after polymerization, polymerized at 41° F. to 60% conversion.

One and one-half parts of acetone-diphenylamine antioxidant were added to the latex. The latex polymer had a raw Mooney viscosity of 150. Mooney viscosities referred to herein are ML-4 measurements at 212° F.—A.S.T.M. Standards on Rubber Products D-927-52T. High Mooney latices, i.e. having a raw Mooney viscosity in the range of 75 to 200 are generally used in preparing masterbatches according to the present invention.

A cationic dispersion of processing oil and carbon black was prepared by first dissolving 0.8 part of a cationic surface-active agent which was a mixture of hexadecyl, octadecyl and octadecenyl amines (Armeen HTD) in 40 parts of a naphthenic processing oil containing 43.0% of aromatics (Circosol 2 XH), and adding the same with agitation to a solution of 0.18 part of acetic acid in 39 parts of water. The thus formed cationic oil emulsion was then added to a mixture of 77 parts of carbon black which had been slurried with 450 parts of water to form the cationic dispersion of the oil-coated carbon black particles. The charge on the oil-coated carbon black particles was reversed and made negative, and the dispersion was transformed into an anionic dispersion, by the addition to the cationic oil-carbon black dispersion of 5 parts of a 10% aqueous solution of sodium hydroxide followed by the addition of 5 parts of a 10% aqueous solution of partially desulfonated sodium lignin sulfonate (anionic surface-active agent) and agitating. The oil-coated carbon black particles in the thus transformed anionic dispersion remained as a single phase dispersed in the aqueous medium.

The thus transferred anionic oil-carbon black dispersion was added to the GR-S latex in the proportion of 117 parts of solids of the dispersion (40 parts of oil and 77 parts of carbon black) to 100 parts of rubber of the latex. The mixture was coagulated, washed and dried in the usual manner to give masterbatch A according to the present invention.

The same composition of oil synthetic rubber-carbon black masterbatch was conventionally prepared by separately mixing with an amount of the above latex containing 100 parts of rubber an emulsion of 40 parts of the Circosol 2 XH processing oil in 39 parts of water, and 1.1 parts of oleic acid, and 0.2 part of sodium hydroxide and a dispersion of 77 parts of Philblack O carbon black in 306 parts of water and 0.3 part of sodium hydroxide and 3 parts of partially desulfonated sodium lignin sulfonate, and coagulating, washing and drying to give the conventional control masterbatch B.

Masterbatches C and D were made in the same manner as A and B above according to the present invention and the method of the prior art, respectively, but substituting the Circosol 2 XH processing oil with the same amount of an aromatic oil (Process #1 supplied by Standard Oil Co. of N.J.) containing 81.4% of aromatics.

The oil-synthetic rubber-carbon black masterbatches B and D made by the conventional procedure and masterbatches A and C made by the process of the present invention were compounded according to the following recipe:

| | Parts by weight |
|---|---|
| Softener-black masterbatch | 400 |
| Zinc oxide | 5.6 |
| Sulfur | 4.6 |
| Benzothiazyl disulfide | 2.3 |
| Diphenyl guanidine | 0.9 |

The compounded Mooney viscosities of samples A, B, C and D were 84, 67, 71 and 76, respectively. Test samples and test wheels were made from the above compounds, vulcanized for various times at 292° F., and unaged stress-strain properties and abrasion resistance ratings were determined. The test wheels were cured ten minues longer than the corresponding stress-strain test samples because the wheels were loaded in cold molds, and the ten extra minutes were to compensate for the period of warming up the mold and test wheels to curing temperature.

The results of the tests are shown in the following table:

| Test | Curing Time of Test Sample, min. | Compound Made From Masterbatch | | | |
|---|---|---|---|---|---|
| | | A | B | C | D |
| Stress-Strain at Room Temp. 300% Modulus, p.s.i. | 25 | 1,770 | 1,210 | 1,500 | 1,140 |
| | 50 | 1,870 | 1,590 | 1,850 | 1,460 |
| | 100 | 1,780 | 1,660 | 1,790 | 1,550 |
| Tensile Strength, p.s.i. | 25 | 3,220 | 2,860 | 3,220 | 3,200 |
| | 50 | 3,320 | 2,930 | 3,300 | 3,180 |
| | 100 | 3,280 | 2,690 | 3,270 | 3,000 |
| Elongation, percent | 25 | 450 | 580 | 530 | 670 |
| | 50 | 480 | 460 | 470 | 540 |
| | 100 | 470 | 440 | 470 | 500 |
| Abrasion Loss (cc. per 3,000 ft.) | 35 | 0.063 | 0.069 | 0.178 | 0.284 |
| | 60 | 0.052 | 0.069 | 0.118 | 0.165 |
| | 110 | 0.073 | 0.085 | 0.096 | 0.130 |
| | 150 | 0.070 | 0.101 | | |
| Abrasion Resistance Rating | 35 | 105 | [1]100 | 123 | [1]100 |
| | 60 | 113 | [1]100 | 116 | [1]100 |
| | 110 | 108 | [1]100 | 126 | [1]100 |
| | 150 | 117 | [1]100 | | |
| Average | | 111 | [1]100 | 122 | [1]100 |

[1] Control for rating.

As may be seen from the results in the above table, the method of the present invention resulted in masterbatches having 100 to 400 p.s.i. (pounds per square inch) higher tensile strengths and significantly better abrasion resistance ratings than obtained for a similar masterbatch prepared by conventional methods.

In view of the many changes and modifications that may by made without departing from the principles underlying the invention, reference should be made to the appended claims for an understanding of the scope of the protection afforded the invention.

Having thus described my invention, what I claim and desire to protect by Letters Patent is:

1. The method of preparing an oil-carbon black synthetic rubber masterbatch which comprises forming a cationic aqueous dispersion of the oil and carbon black with cationic surface-active agent, adding anionic surface-active agent to said cationic dispersion in amount to impart a negative charge to the oil-coated carbon black particles and transform the dispersion into an anionic dispersion, mixing the thus formed anionic oil-carbon black dispersion with an anionic butadiene polymer synthetic rubber latex, and co-coagulating the synthetic rubber and oil and carbon black.

2. The method of claim 1 in which the synthetic rubber is a copolymer of a major proportion of butadiene-1,3 and a minor proportion of styrene.

3. The method of claim 1 in which the amount each of oil and carbon black used is 25 to 100 parts per 100 parts of synthetic rubber in the latex.

4. The method of claim 2 in which the amount each of oil and carbon black used is 25 to 100 parts per 100 parts of synthetic rubber in the latex.

References Cited in the file of this patent

D'Ianni et al.: "Rubber Age," June 1951, pages 317–321.

"The Rubber Age and Synthetics," volume 32, No. 6, Aug. 1, 1951, pages 197–200.